United States Patent [19]

Upton et al.

[11] 4,258,778
[45] Mar. 31, 1981

[54] ROLLER BAR CONSTRUCTION

[75] Inventors: Albert E. Upton, 7502 Riverbrook, Dallas, Tex. 75230; Barney G. Upton, Irving; Jack S. Craig, Dallas, both of Tex.

[73] Assignee: Albert E. Upton, Dallas, Tex.

[21] Appl. No.: 926,027

[22] Filed: Jul. 19, 1978

Related U.S. Application Data

[63] Continuation-in-part of Ser. No. 864,770, Feb. 15, 1978, abandoned.

[51] Int. Cl.³ .................... A47H 13/00; E04F 10/06
[52] U.S. Cl. ................................. 160/383; 160/67
[58] Field of Search ............... 160/66, 67, 71, 133, 160/383, 387, 400, 402, 404, 391, 392; 52/727; 264/46.6

[56] References Cited

U.S. PATENT DOCUMENTS

| | | | |
|---|---|---|---|
| 258,410 | 5/1882 | Goldsmith | 160/378 |
| 1,032,112 | 7/1912 | Challinor | 160/378 |
| 1,207,943 | 12/1916 | Lemon et al. | 160/391 |
| 1,898,686 | 2/1933 | Rice | 160/392 |
| 3,612,145 | 10/1971 | Darula | 160/67 |
| 3,968,561 | 7/1976 | Oakes et al. | 264/46.6 |
| 4,033,397 | 7/1977 | McKee | 160/67 |

FOREIGN PATENT DOCUMENTS

| | | | |
|---|---|---|---|
| 1956394 | 6/1970 | Fed. Rep. of Germany | 160/133 |
| 2450595 | 4/1975 | Fed. Rep. of Germany | 52/727 |

Primary Examiner—Peter M. Caun

[57] ABSTRACT

An awning roller bar or lead bar is formed from a relatively thin material for attachment to the leading edge of an awning. In one embodiment, the roller bar includes at least one slideway having an exterior aperture for receiving and securing the edge of a canopy to the tubing. In another embodiment the roller bar has a plurality of planar walls, a pair of interlocking folds and a substantially triangular slideway. If desired, more than one slideway can be formed in the tubing to provide for the attachment of a screen, valance, sunshade or the like. For reinforcement, an expandable material is injected into at least a portion of the tubing core. The expansion and subsequent stabilization of the foamed material strengthens the tubing to provide a roller bar of rigid construction and light weight. Alternately, rigid inserts may be spaced apart within the roller bar to provide reinforcement, or, in some instances, the configuration of the roller bar, itself will provide the strength necessary to support the awning.

4 Claims, 13 Drawing Figures

ROLLER BAR CONSTRUCTION

CROSS REFERENCE TO RELATED APPLICATION

This application is a continuation-in-part of a copending application entitled "Improved Roller Bar Construction", Ser. No. 864,770, filed Feb. 15, 1978 now abandoned.

BACKGROUND AND SUMMARY OF THE INVENTION

The present invention relates generally to a novel construction for awning roller or lead bars, and more particularly concerns a method of constructing roller bars for extendible awnings of the roll-up type popularly utilized with recreational vehicles.

The vigorous pursuit of leisure time activities by Americans has fostered the growth of several diverse industries. Among these industries, the construction of recreational vehicles and their accessories has found a wide market. In particular, trailers, vans and motor homes are favorites with families that enjoy traveling or camping. Extendible awnings have become, in turn, one of the most popular accessories for such recreational vehicles. These awnings generally include a sheet of flexible canopy material secured along one end of the vehicle and secured along the opposite end to a roller bar supported by uprights. Besides the weight of the canopy, wind and precipitation loads further contribute to the stress on the roller bar. Frequently, a valance, screen or sunshade is also attached to the roller bar. To meet the structural requirements, roller bars heretofore have been of extruded or drawn construction. However, roller bars constructed according to the prior art tended to be both heavy and expensive.

The present invention comprises a roller bar construction particularly adapted for use with recreational vehicle awnings which overcomes the foregoing and other problems long since associated with the prior art. In accordance with the broader aspects of the invention, a straight, predetermined length of thin-walled tubing is first provided such as by roll forming the tubing from a sheet of metal. The outer configuration of the tubing provides strength and stiffening, and a reinforcing medium may be provided inside the roller bar, if desired or necessary. By means of this invention, roller bars can be constructed with significant cost and weight savings.

In accordance with more specific aspects of the invention, a section of thin-walled tubing is roll formed from a sheet of metal. Longitudinal profiles are then roll formed into the tubing for partial reinforcement of the tubing to resist bending stresses. However, it will be appreciated that even after formation of the profiles therein, additional reinforcement may be desirable. An expandable material, such as a foamed plastic, is then injected into at least a portion of the space defining the core of the tubing. The expansion and subsequent stabilization of the material into a rigid foam core further strengthens the tubing to provide a strong, light-weight roller bar.

In accordance with another aspect of the invention, the tubing may be roll formed having eight equilateral sidewalls and having a slideway formed along the midregion of at least one of said walls. The roller tubing is formed of a continuous sheet having two longitudinal edges with U-shaped folds for interlocking the edges together to form a closed tubing. Crooks are provided to recess the folds such that the exterior surface of the roller bar is substantially even.

The slideway includes a longitudinal aperture extending along the midregion of one of the equilateral sidewalls. Two slideway walls extend from the edges of the aperture inwardly at about 45° angle with the sidewall. A curved third slideway wall extends between the other two slideway walls to form a substantially triangularly shaped slideway. A plurality of such slideways may be formed in the tubing, and all corners of the roller bar may be rounded.

A roll formed octagonal roller bar with one or more longitudinal slideways will have sufficient strength for many awning applications. However, if additional strengthening is necessary or desirable, a foamed plastic may be injected into at least a portion of the roller bar, or inserts conforming to the shape of the roller bar may be spaced within the bar to provide reinforcement.

The roller bar of the present invention may include one or more longitudinal slideways for attaching awnings, valances, screens and the like to the roller bar. In another embodiment, the roller bar is formed with a continuous exterior surface, and the awning is attached to the roller bar by fasteners or adhesives, or by insertion of the roller bar through a loop sewn on the edge of the awning, or by a combination thereof.

DESCRIPTION OF THE DRAWINGS

A more complete understanding of the invention may be had by reference to the following detailed description when taken in conjunction with the accompanying drawings, wherein.

DETAILED DESCRIPTION

Figure 1:
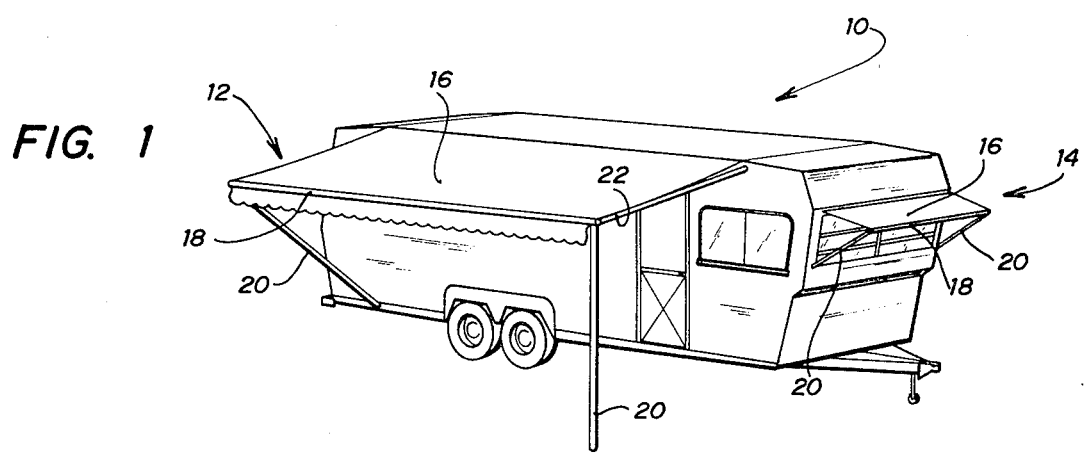
FIG. 1 is an illustration of a recreational vehicle including an awning with a leader or roller bar.

Referring now to the drawings, and particularly to FIG. 1 thereof, there is illustrated a recreational vehicle 10 having awnings 12 and 14 with which the leader or roller bar construction of the present invention is particularly suited. Each of the awnings 12 and 14 includes a generally rectangular canopy 16 formed of a flexible material, such as canvas or vinyl. Secured along one side to vehicle 10, each canopy 16 is connected to and supported by a roller or lead bar 18 along the opposite side. Bars 18 in turn are supported by uprights 20. Particularly with the larger awning 12, side braces 22, only one of which is shown, are often utilized to lend additional stability to the awning. The relatively smaller awning 14 is employed to protect a small opening, such as a window. The relatively larger awning 12 is most popularly used to construct a temporary enclosure adjacent to the recreational vehicle 10. For example, awning 12 may extend up to eight feet from and up to twenty feet along vehicle 10 and may be utilized for a car port, breezeway, porch or the like. The roller bar construction of the present invention is suitable for either awning 12 or awning 14, however it is most beneficial in conjunction with the higher stress requirements of a large awning. Allthough depicted in FIG. 10 as a trailer, it will be understood that recreational vehicle 10 could be a camper, van, motor home or any other type of recreational vehicle utilizing collapsible awnings.

Figure 2:
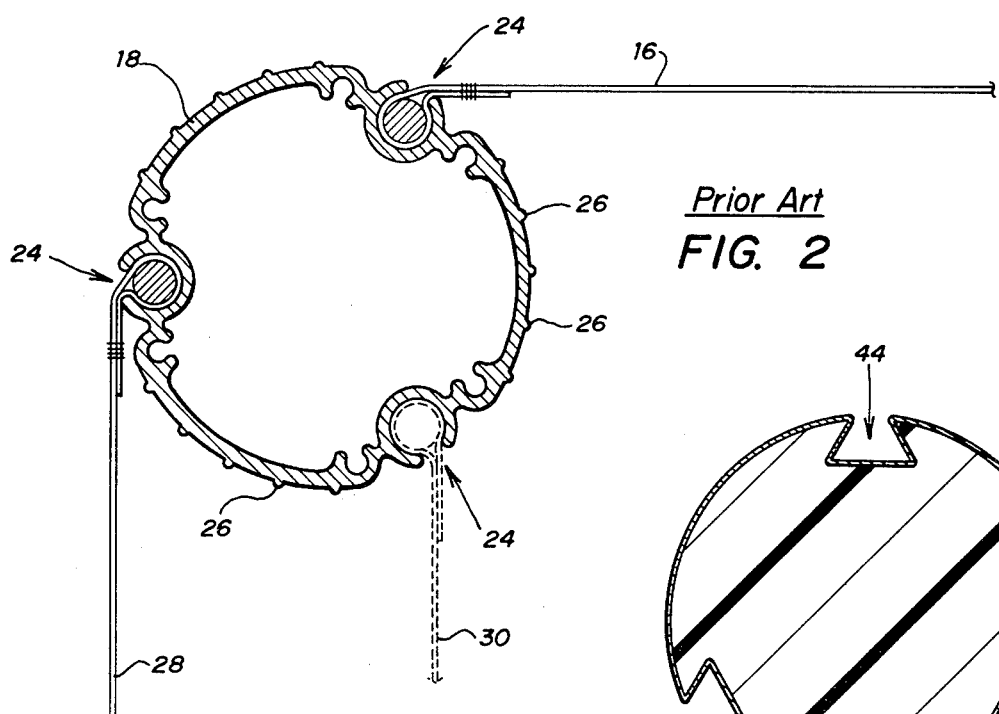
FIG. 2 is an enlarged cross sectional view of a roller bar typifying of the prior art.

Referring now to FIG. 2, there is shown a cross section of a roller bar 18 representative of the prior art. Bar 18 comprises a hollow tube of extruded or drawn metal characterized by a relatively thick wall. Steel or aluminum is often the metal utilized to form bar 18 of the prior art. Three longitudinal channels 24 together with ribs 26 can be extruded into the wall of bar 18. Channels 24 are utilized to receive and secure the edge of canopy 16, and the edges of a valance 28 and a screen or wall 30, if desired. While channels 24 and ribs 26 may contribute to the structural vigor of bar 18, it will be understood that the substantial wall thickness of prior art bar 18 is the primary structural factor. Moreover, the extrusion process is relatively complex and therefore expensive. Consequently, bars 18 constructed in accordance with the prior art are unnecessarily costly and heavy.

Figure 3:
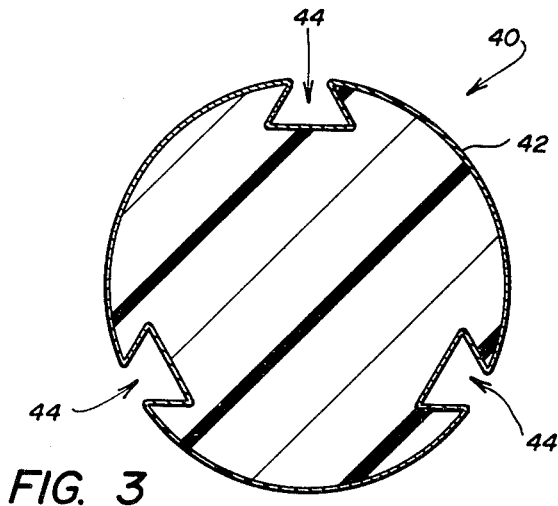
FIGS. 3, 4 and 5 are enlarged cross sectional views of roller bars constructed in accordance with the present invention.
Figure 5:
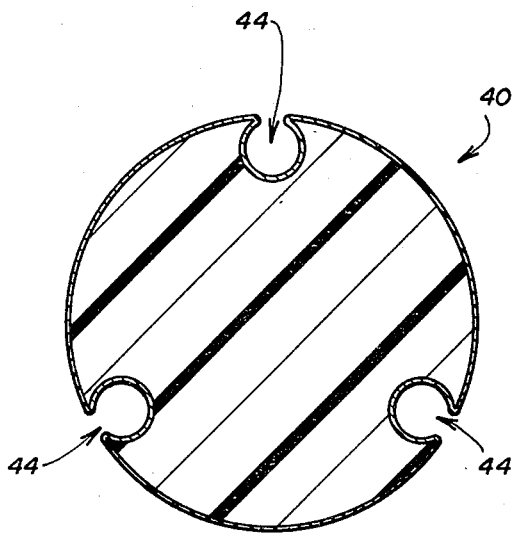
Figure 4:
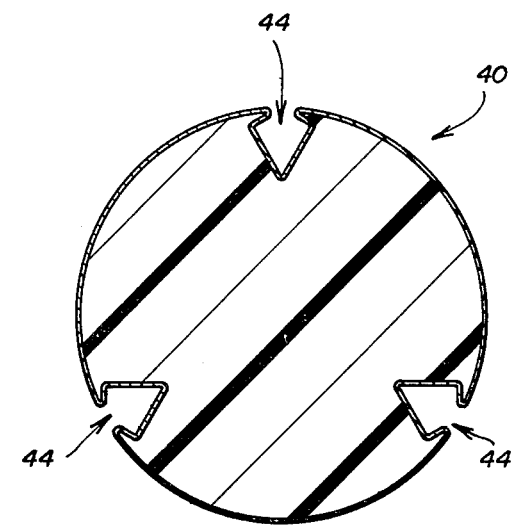

With reference to FIGS. 3, 4 and 5, there are shown cross sectional views of roller bars 40 constructed according to the present invention. Bar 40 constitutes a significant improvement over bar 18 hereinbefore described, and is particularly suited for use with awnings on recreational vehicles. Improved roller bar 40 is lighter and less expensive than those found in the prior art, while meeting the same structural requirements.

In the construction of roller bar 40, a straight, predetermined length of tubing 42 having a hollow core is first provided. Tubing 42 is preferably of circular cross section and is characterized by thin-walled construction. Tubing 42 can be constructed of any suitable rigid material, such as steel, aluminum or plastic. For example, a length of aluminum tubing having a three inch outside diameter and a wall thickness ranging from approximately 0.015 to 0.060 inches has been found satisfactory. Tubing 42 thus comprises an elongate, thin-walled cylinder.

The desired longitudinal profiles 44 are then formed into the outside surface of tubing 42. Profiles 44 may be of any desired configuration suitable for serving as slideways having exterior apertures for attachment of the edges of a canopy, screen, wall or valance. FIGS. 3, 4 and 5 show examples of three alternative profiles 44 which could be formed in tubing 42. Although the examples of FIGS. 3-5 depict three profiles per roller bar, it will be understood that the desired number of profiles 44 can be any plurality. In one embodiment of the present invention, at least one longitudinal profile with an exterior aperture is formed in tubing 42 to provide for the connection of a canopy similar to canopy 16. A plurality of longitudinal profiles 44 can be produced at regular circumferential intervals, preferably, around tubing 42 by means of a conventional roll forming process. The formation of profiles 44 not only provides the desired slideways therein, but serves to partially reinforce tubing 42. Tubing 42 is thus stiffened by longitudinal profiles 44.

Figure 6:
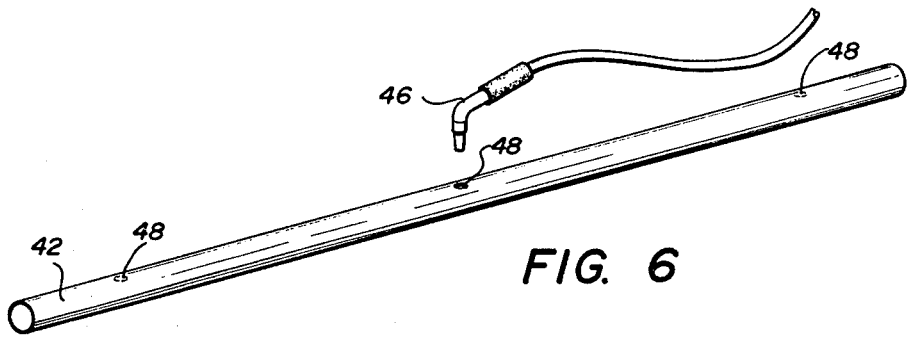
FIG. 6 is an illustration of a step in the roller bar construction of the invention.
Figure 7:
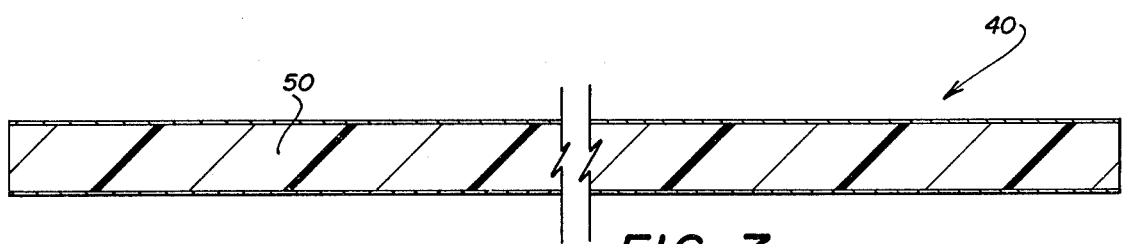
FIGS. 7 and 8 are broken sectional views of roller bars constructed according to the invention.
Figure 8:
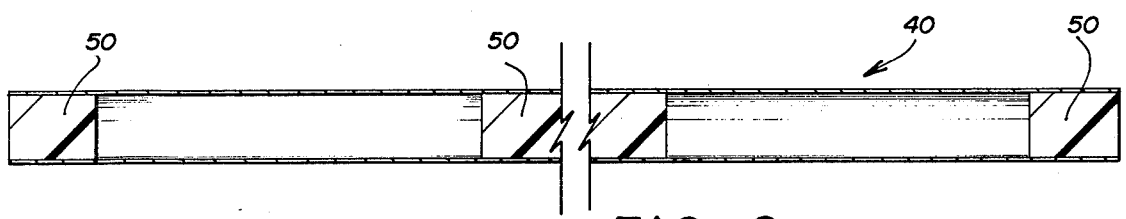

Turning to FIG. 6, an expandable material is then injected from nozzle 46 into the hollow core of tubing 42 for additional reinforcement. Nozzle 46 is connected to a source (not shown) of expandable material in liquid form. The material discharged from nozzle 46 can be a foamed plastic, or an expandable polymer such as polystyrene, polyethylene or polyurethane, which expands to a low density cellular state. As shown in FIG. 6, the expandable material is injected through holes 48 into tubing 42. However, it will be understood that the tubing can be filled from either end without holes 48. After injection into tubing 42, the material expands to fill at least a portion of the core of tubing 42. With the stabilization of the foamed material within tubing 42, a rigid core 50 is formed therein. Core 50 is characterized by low density and high rigidity so as to longitudinally reinforce tubing 42 and to provide a lightweight roller bar 40 in full satisfaction of the structural requirements. For the greatest strength, core 50 extends completely through bar 40 as shown in FIG. 7. For some applications, it may be sufficient to provide for sections of core 50 within bar 40 as is depicted in FIG. 8. It will also be understood that bar 40 is suitable for some applications without reinforcement.

Figure 9:
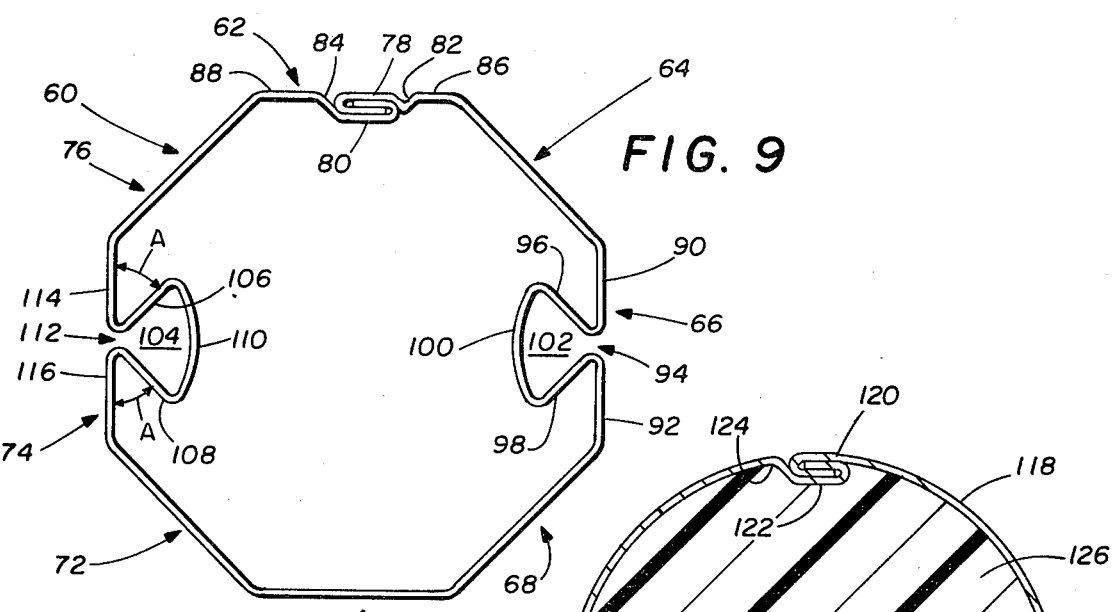
FIG. 9 is a cross sectional view of an octagonal roller bar of the present invention having eight equilateral sides, interlocking folds and two triangular shaped slideways.

Referring now to FIG. 9, there is shown a cross sectional view of a roller bar 60 illustrating one embodiment of the present invention. Roller bar 60 includes eight equilateral sidewalls 62, 64, 66, 68, 70, 72, 74 and 76, each intersecting at an angle of approximately 135° to form a substantially equilateral octagonal cross sectional profile. The diameter or width of roller bar 60 from wall to wall is approximately three inches.

Roller bar 60 is formed from one continuous sheet of metal, preferably 28 to 24 gauge galvanized steel, having two longitudinal edges on which U-shaped folds 78 and 80 are formed. The U-shaped folds 78 and 80 are interlocked to form a closed tubing, and crooks 82 and 84 are formed adjacent folds 78 and 80, respectively, to recess the two folds inwardly towards the center of roller bar 60. Extending, respectively, from crooks 82 and 84 are sidewall portions 86 and 88. Thus, the sidewall 62 is formed by sidewall portions 86 and 88, crooks 82 and 84, and the folds 78 and 80. By recessing the folds 78 and 80, the exterior portion of fold 78 is substantially coplanar with the sidewall portions 86 and 88, and the exterior surfaces of sidewall 62 is substantially flat.

The sidewall 66 of roller bar 60 includes two sidewall portions 90 and 92 and a longitudinal aperture 94 extending along the midregion of sidewall 66 separating the sidewall portions 90 and 92. Two slideway walls 96 and 98 extend from the sidewall portions 90 and 92, respectively, forming an angle A of approximately 45° with respect to the two sidewall portions. Extending between slideway walls 96 and 98 is a curved slideway wall 100. Because of the curvature of slideway wall 100, the angle between wall 100 and walls 96 and 98 is greater than 45°, and is approximately 50°. The combination of slideway walls 96, 98 and 100 forms a longitudinal slideway 102 having a triangular cross section and communicating with the exterior of roller bar 60 through aperture 94.

An identical slideway 104 is formed along sidewall 74 by slideway walls 106, 108 and 110. Slideway 104 communicates with the exterior of roller bar 60 through an aperture 112. Also, slideway walls 106 and 108 extend from wall portions 114 and 116, respectively, forming an angle therewith which is approximately 45°. Likewise, the angles formed between slideway wall 110 and walls 106 and 108 are approximately 50°. It should be noted that all corners between all walls and wall portions may be rounded as shown in FIG. 9 in accordance with conventional roll forming techniques.

The construction disclosed in FIG. 9 is considered an important aspect of the present invention. It has been found that this structure is well adapted for strength and durability as a roller bar for an awning. Although the octagonal configuration of roller bar 60 and the slideways 102 and 104 provide sufficient strength and stiffness for many awning applications, it will be understood that roller bar 60 may be reinforced with foam or inserts as described with respect to alternate embodiments of the present invention. Additionally, it has been found that the structure shown in FIG. 9 is relatively easy to manufacture by roll forming techniques.

Figure 10:
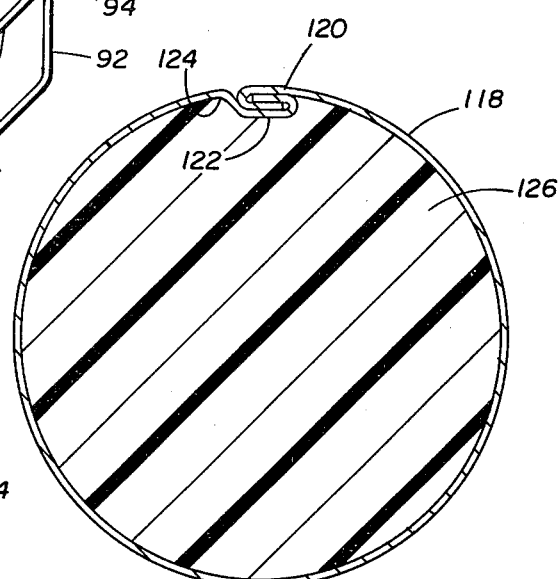
FIG. 10 is a cross section of a cylindrical roller bar of the present invention having a continuous exterior configuration.

Referring now to FIG. 10, there is shown a roller bar 118 constituting an alternate embodiment of the present invention. Roller bar 118 has a substantially circular cross section and is formed by conventional roll forming techniques from a sheet of metal. Folds 120 and 122 are formed along the longitudinal edges of roller bar 118 and are interlocked to form a substantially closed tubing. A crook 124 recesses fold 122 inwardly with respect to roller bar 118 to provide a substantially round exterior cylindrical surface on roller bar 118 in the region of folds 120 and 122. Roller bar 118 also includes reinforcing material 126 for stiffening and strengthening the roller bar. Reinforcing material may be a foam material that is injected into the roller bar 118 in the liquid state as discussed above in conjunction with FIG. 6. Alternately, reinforcing material 126 may comprise a pre-formed shape made of foam or from various solid materials.

Figure 11:
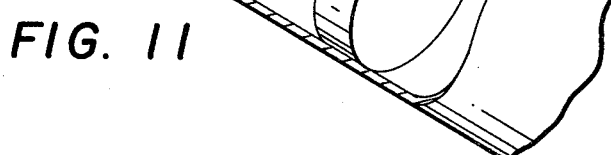
FIG. 11 is a broken away view of a roller bar showing a dumbbell insert.
Figure 12:
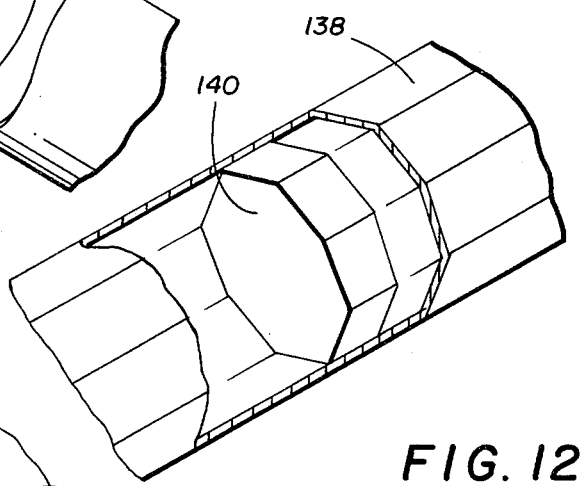
FIG. 12 is a broken away view of a roller bar showing an octagonal insert.

Referring now to FIG. 11, a substantially cylindrical roller bar 128 is shown partially cut away to reveal a dumbbell insert 130. The dumbbell insert 130 includes two plugs 132 and 134 dimensioned to conform to the interior configuration of roller bar 128. The plugs 132 and 134 are connected by a tapered transverse bar 136 for preventing either of the plugs 132 or 134 from skewing inside roller bar 128. In the preferred embodiment, plugs 132 and 134 are approximately 1½ inches thick and approximately 3 inches in diameter. Referring now to FIG. 12, an octagonal roller bar 138 is shown partially broken away to reveal an octagonal plug 140 disposed within the roller bar. Plug 140 conforms to the interior configuration of roller bar 138 and functions to strengthen and stiffen the roller bar.

Referring now to FIGS. 11 and 12, it will be understood that a plurality of inserts, such as insert 130 or plug 140, may be placed inside a roller bar at spaced positions to provide regular reinforcement along the roller bar. It will also be understood that the octagonal plug 140 may be combined with another octagonal plug in a dumbbell configuration as disclosed in FIG. 11 to prevent skewing inside the roller bar. Suitable materials for the insert 130, the plug 140, and other shapes for reinforcing roller bars include various foam materials, natural and synthetic rubber materials, plastics, wood, metals, etc.

Figure 13:
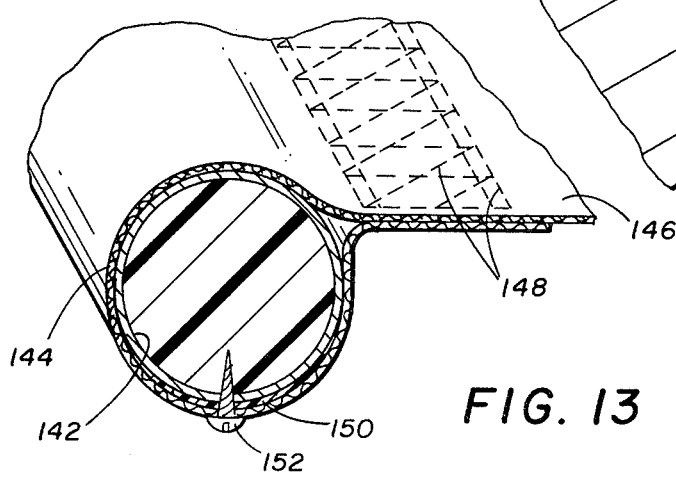
FIG. 13 is a perspective view of a roller bar extending through a loop on the edge of an awning with fasteners and adhesives attaching the awning to the roller bar.

Referring now to FIG. 13, there is disclosed a substantially cylindrical roller bar 142 inserted within a loop portion 144 formed on the leading edge of an awning 146. The loop portion 144 is formed by turning the leading edge of the awning 146 back on itself and sewing a seam 148 along the leading edge. In this configuration, it is not necessary to use a slideway to attach a roller bar to an awning.

Fasteners 152 and/or adhesive 150 may be used to further secure the loop portion 144 to the roller bar 142. Fasteners 152 are sheet metal screws used to firmly clamp the loop portion 144 against the roller bar 142. Adhesive 150 is placed between the loop portion 144 and the roller bar 142 to secure the loop portion to the roller bar. Adhesive 150 may be any of numerous modern adhesives suitable for gluing plastic to plastic or plastic to metal. Other fastening means may be used to secure the awning to the roller bar in accordance with particular requirements.

From the foregoing, it will be understood that the present invention comprises an improved leader or roller bar construction for awnings which incorporates numerous advantages over the prior art. The advantages deriving from the invention will readily suggest themselves to those skilled in the art.

Although particular embodiments of the invention have been illustrated in the accompanying drawings and described in the foregoing detailed description, it will be understood that the invention is not limited to the embodiments disclosed, but is intended to embrace any alternatives, modifications, or rearrangements and substitutions of parts and elements as fall within the spirit and scope of the invention.

What is claimed is:

1. An awning assembly for a recreational vehicle, which comprises:
   a flexible awning having a leading edge and a trailing edge;
   the trailing edge of said awning being secured to the recreational vehicle;
   a roller bar for attachment to the awning, said roller bar comprising:
   a hollow tube defined by a single piece of sheet metal roll-formed into a predetermined cross-sectional shape;
   the shape of said tube being polygonal and defined by a plurality of substantially equilateral flat sides separated by bends;
   said piece of sheet metal having opposed longitudinal edges which are folded back, hooked together and permanently crimped in interlocking engagement;
   said tube including a longitudinal slideway integrally formed into the piece of sheet metal receiving and retaining the leading edge of said awning;
   the slideway being peripherally spaced away from the crimped edges of the sheet metal defining said tube; and
   at least one rigid foam plug disposed inside said hollow tube for substantially reinforcing and stiffening the roller bar against bending loads and other forces exerted by said awning.

2. The awning assembly of claim 1, further including: means for supporting the ends of said roller bar.

3. The awning assembly of claim 1, wherein said hollow tube is octagonal in cross-section.

4. The awning assembly of claim 1, further including: said tube including a second longitudinal slideway integrally formed into the piece of sheet metal adapted to receive and retain other awning components.

* * * * *